Oct. 21, 1958     T. B. DILWORTH     2,857,056
COUPLING ASSEMBLY
Filed May 2, 1955
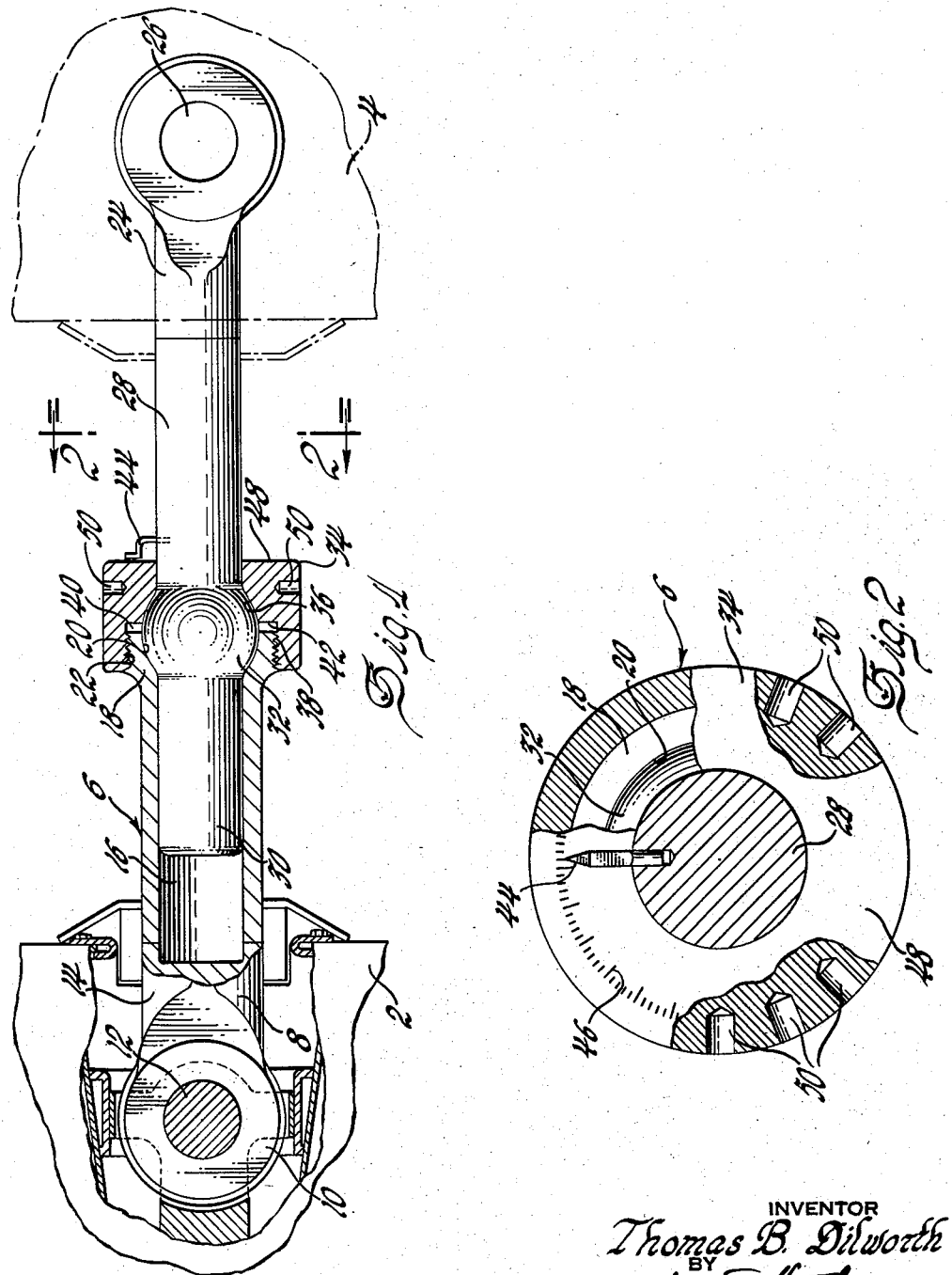
INVENTOR
*Thomas B. Dilworth*
BY
*S. C. Thorpe*
ATTORNEY

United States Patent Office 2,857,056
Patented Oct. 21, 1958

2,857,056

COUPLING ASSEMBLY

Thomas B. Dilworth, Hinsdale, Ill., assignor to General Motors Corporation, Detroit, Mich., a corporation of Delaware Application May 2, 1955, Serial No. 505,295

5 Claims. (Cl. 213—1)

This invention relates generally to motion and force transmitting couplers acting primarily in tension and compression and more particularly to coupling assemblies for use between adjoining railway vehicles. The invention primarily concerns a collision shock link between railway vehicles which in the event of a collision will fail in such a manner as to absorb a great deal of energy in compression.

It is therefore first of all an object of this invention to provide a novel coupling assembly for use in tension and compression between adjoining members.

It is a further object of this invention to provide a novel coupling assembly between adjoining members which acts in either tension or compression.

It is still another object of this invention to provide a novel coupling assembly between adjoining railway vehicles which is normally rigid but which when subjected to high shock compressive forces between the vehicles tends to rupture and thereby cushion the transmittal of the shock forces between the vehicles by absorbing tremendous amounts of energy.

It is another object of this invention to provide means in the novel coupling assembly to compensate for certain limited amounts of rupture which may occur.

It is a further object of the invention to provide indicating means for determining the amount of rupture to thereby enable the coupling to be repaired or replaced in the event the rupturing exceeds a predetermined amount.

For a fuller understanding of the above and further objects of this invention attention is directed to the accompanying detailed description and drawing, in which:

Fig. 1 is a view in plan of the novel coupling assembly shown connected to the ends of adjoining railway vehicles.

Fig. 2 is a view taken on the line 2—2 of Fig. 1 illustrating certain features of the coupling including the special holes for enabling the collar of the coupling to be tightened or loosened and also the indicating means for determining the amount of rupture in the female portion of the coupling.

Referring now to the drawing, portions of a pair of adjoining railway vehicles 2 and 4 between which the coupling assembly, indicated generally by the numeral 6, is interposed are shown. The coupling assembly 6 includes a first member 8 having an end 10 adapted to be pivotally secured to the end of the railway vehicle 2 in the manner shown by means of a coupler pin 12 extending therethrough and suitably anchored in receptacles provided in the end of the railway vehicle 2. The member 8 is provided with a female shank 14 which is cylindrical or tubular in form and is provided with an internal cylindrical passage or hollow portion 16. The cylindrical portion 16 of the female shank 14 enlarges at one end 18 thereof into a spherically shaped socket defined by surface 20. The end 18 is provided on its outer periphery with threads 22.

A second member 24 is suitably pivotally connected to the railway vehicle 4 for pivotal movement with respect thereto by a pin 26 fixed in the same way in the vehicle 4 as the pin 12 is fixed in the vehicle 2. The member 24 includes a male shank or rod-like portion 28 having a pilot portion 30 and a ball-like member 32 intermediate the pilot portion 30 and the remaining rod-like portion 28. Surrounding the rod-like portion 28 is a fastening assembly comprising a collar 34 also provided with a socket defined by a surface 36. Surface 36 is abuttable with the enlarged ball portion 32 opposite the socket surface 20. The collar 34 overlaps the end 18 of the female shank 14 and is provided with internal threads 38 which mate with the threads 22 so that the collar may be turned thereon to rigidly clamp the members 8 and 24 together and the spherical enlarged ball-shaped portion 32 in the socket surfaces 20 and 36.

The operation of the novel coupling assembly 6 is as follows: In normal operation the coupling assembly is rigid and will act either in tension or compression, and articulation of the assembly will be about the pins 12 and 26 at the opposite ends of the members 8 and 24. In the event of collision wherein the railway vehicles 2 and 4 would tend to very suddenly move together, the male shank including the enlarged portion 32 will be further forced into the female shank which is made of ductile material and tend to rupture this female shank thereby absorbing a tremendous amount of energy which tends to cushion the transmittal of the shock load applied to one car by the collision through the coupling assembly. If the collision is extremely severe the female shank portion 14 will probably be ruptured to such an extent that it will have to be replaced. If, however, only a slight rupturing of the female shank portion takes place adjacent the socket surface 20 then the collar 34 may be further tightened on the threads 22 because of the presence of a certain amount of clearance 40 between the end 18 of the female shank portion 14 and a surface 42 forming the bottom of a hole tapped in the collar 34. The amount of turning of the collar 34 upon subsequent rupturings due to impacts on the cars 2 and 4 may be indicated by means of a pointer 44 mounted in the male shank portion 28 and indicia 46 provided on a face 48 of the collar 34. In other words, as the collar is turned from its initial position before any rupturing has occurred the amount of turning will indicate the amount of take up of the clearance 40 and also the amount of rupturing. To turn the collar 34, a plurality of radially extending holes or openings 50 have been provided in the outer periphery thereof which are adapted to take a special tool at any convenient location so that turning is easily accomplished. The collar 34 would normally be placed on the male shank 28 first and then the enlarged portion 32 either suitably built up as by adding layers of metal or else by heating and upsetting, as for example, by forging, although any suitable method may be employed to accomplish this result.

What I claim is:

1. A railway vehicle coupling assembly for use in tension and compression between adjoining railway vehicles comprising a first member pivotally securable to one of the vehicles and a second member pivotally securable to the adjoining vehicle, said first member having a hollow portion with an enlarged socket formed in an open end thereof, the other of said members having an elongated portion received in the hollow of said first member and an enlarged portion received in said socket, said hollow portion being more ductile than said enlarged portion, a collar on said second member abutting said enlarged portion opposite said socket, and means on said collar and said first member for securing said collar to said first member to thereby retain under normal use of said coupling assembly said enlarged portion in said socket and immovable relative thereto.

2. A motion and force transmitting coupling assembly between adjoining railway vehicles comprising a female shank having an open socket end, a male shank having a pilot portion guided within said female shank and an enlarged portion intermediate the ends thereof received in said socket, a collar around said male shank abutting said enlarged portion opposite said socket and secured to said female shank to render said shanks normally immovable relative to each other whereby upon axial movement of said shanks toward each other due to abnormal forces applied thereto said enlarged portion causes deformation of at least one of said shanks and in so doing absorbs energy to thereby cushion the transmittal of shock forces between the adjoining vehicles.

3. A coupling assembly extending between adjoining railway vehicles comprising a first coupler having an elongated tubular portion, said portion including an enlarged socket formed at an open end thereof and having threads defining the outer periphery thereof, a second coupler having an elongated rod-like portion including a pilot portion at one end thereof and an enlarged ball-like portion intermediate said pilot portion and the remaining part of said rod-like portion, said pilot portion being received within said tubular portion and said enlarged portion being received in said socket, a collar on said rod-like portion abutting said enlarged portion opposite said socket, said collar having threads engageable with the threads on the end of said tubular portion tightenable to clamp said couplers together and render them immovable relative to each other under normal loads and forces, said tubular portion being more ductile than said enlarged portion whereby upon axial movement of said couplers toward each other under the influence of sudden impact applied to said vehicles said tubular portion will be deformed and act as a cushioning device by absorbing energy.

4. A railway vehicle coupler assembly comprising telescoped male and female members, one of said members having an enlarged portion, one of said members being ductile relative to the other, whereby upon relative movement of said members under abnormal impact forces said ductile member is deformed and absorbs energy.

5. A coupling assembly extending between adjoining railway vehicles comprising a first coupler having an elongated tubular portion, said portion including an enlarged socket formed at an open end thereof and having threads defining the outer periphery thereof, a second coupler having an elongated rod-like portion including a pilot portion at one end thereof and an enlarged ball-like portion intermediate said pilot portion and the remaining part of said rod-like portion, said pilot portion being received within said tubular portion and said enlarged portion being received in said socket, a collar on said rod-like portion abutting said enlarged portion opposite said socket, said collar having threads engageable with the threads on the end of said tubular portion tightenable to clamp said couplers together and render them immovable with respect to each other when subject to normal impact forces, said tubular portion being more ductile than said enlarged portion whereby upon axial movement of said couplers toward each other under the influence of abnormal sudden impact forces applied to said vehicles said tubular portion will be deformed and act as a cushioning device by absorbing energy, there being clearance between the end of said tubular portion and said collar so that upon limited deformation of said tubular portion the slack formed thereby may be taken up.

References Cited in the file of this patent

UNITED STATES PATENTS

| | | |
|---|---|---|
| 663,757 | Hertel | Dec. 11, 1900 |
| 757,143 | Reilly | Apr. 12, 1904 |
| 771,457 | Bullard | Oct. 4, 1904 |
| 933,584 | Rick | Sept. 7, 1909 |
| 954,177 | Fleming | Apr. 5, 1910 |
| 1,020,445 | Potter | Mar. 19, 1912 |
| 2,103,172 | Patjens | Dec. 21, 1937 |
| 2,115,095 | Bugatti | Apr. 26, 1938 |
| 2,282,146 | Mealing et al. | May 5, 1942 |
| 2,615,373 | Pegard | Oct. 28, 1952 |
| 2,642,195 | Jack et al. | June 16, 1953 |
| 2,682,931 | Young | July 6, 1954 |